Aug. 17, 1965 P. G. STEVENHAGEN 3,201,766
MEMORY MATRIX WITH INSULATING FRAME
Filed Aug. 23, 1961
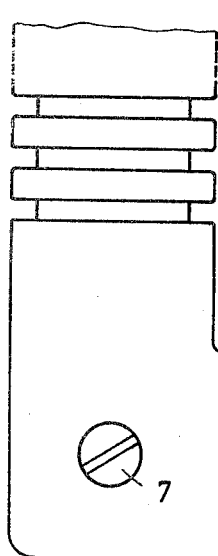
FIG.1
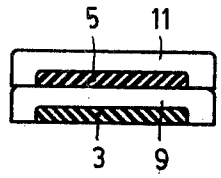
FIG.2
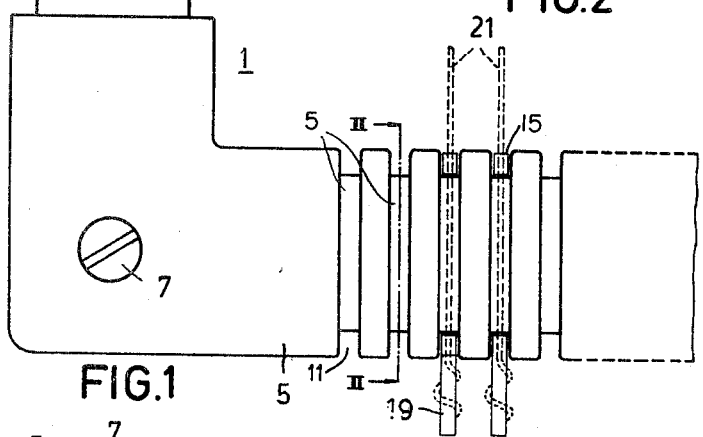
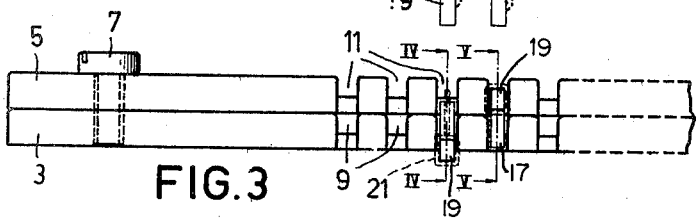
FIG.3
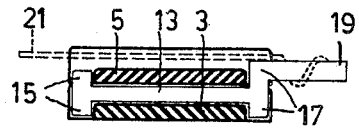
FIG.4  FIG.5
INVENTOR
PIETER G. STEVENHAGEN
BY
AGENT United States Patent Office 3,201,766
Patented Aug. 17, 1965

3,201,766
MEMORY MATRIX WITH INSULATING FRAME
Pieter Gerrit Stevenhagen, Eindhoven, Netherlands, assignor to North American Philips Company, Inc., New York, N.Y., a corporation of Delaware
Filed Aug. 23, 1961, Ser. No. 133,451
Claims priority, application Netherlands, Sept. 22, 1960, 256,150
4 Claims. (Cl. 340—174)

The invention relates to a frame for a memory matrix having crossed wires and ring cores which are held in the insulating frame, said frame comprising two battens superimposed one upon the other, at least one of the battens being provided with transverse grooves in which strip-shaped connecting lugs are enclosed between the battens. As compared with another known matrix having connecting lugs firmly provided in a frame consisting of compressed material, this construction has the advantage that the lugs can be provided in the grooves of the battens, which are preferably milled, at very accurately equal spacing and consequently may be provided very near to one another. The number of lugs per unit of length of each of the sides of the frame as a result may be considerable.

In a known embodiment, the ends of the wires are connected to soldering lugs which are formed by lugs projecting at right angles on the inner side of the frame. The fixing of the thin wires at the exact mutual distances is somewhat uncertain in this embodiment, as a result of which the mutual distance of the soldering lugs cannot be so small as is possible in the case of a better guiding of the wires. In addition, dip soldering of the connection is not possible.

According to the invention these drawbacks are mitigated in that the two battens are provided at one side with transverse grooves and are provided upon each other in a manner such that the grooves of the first batten containing the connection lugs, are closed by the smooth side of the second batten, in which each of the wires extends through one of the grooves of this batten to the associated connecting lug which lies near to this groove. The grooves of the second batten which preferably is of an identical shape, serve for the accurate guiding of the ends of the wire which are connected to soldering lugs which project on the outside of the frame. Dip soldering of these connections naturally is easily possible.

It is noted that providing transverse grooves in an insulating frame for the guiding of the ends of the wire to be connected has been proposed, however, the frame consists of compressed material which renders larger distances between adjacent connecting lugs necessary.

In order that the invention may readily be carried into effect, one embodiment thereof will now be described, by way of example, with reference to the accompanying drawing, in which:

FIGS. 1 and 3 show part of the rectangular frame of a memory matrix according to the invention in plan view and side view respectively, FIGS. 2, 4 and 5 show cross-sections of the frame taken along line II, IV, V of FIGS. 1 and 3. The ring cores of the matrix supported by the frame are omitted from the figures for the sake of simplifying the description, while the ends of the wires which are threaded through the cores in normal manner, are shown in dotted lines.

The frame 1 of the memory matrix partially shown in FIGS. 1 and 3 comprises two preferably identically shaped insulating battens 3 and 5 having an open rectangular shape, i.e., rectangular ring which are positioned one upon the other and are secured together by means of bolts 7. Each of the battens are provided with identical transverse grooves 9 and 11, respectively so that the grooves are situated directly over one another in each side or leg of the frame. The grooves are preferably formed in the insulating material of the battens by milling and are deeper at the ends as shown in FIG. 2. The figures are drawn to a scale of approximately 3:1. Actually, the grooves 11 and 9 may have a width of less than 1 mm. Strip-shaped metal connecting lugs 13 are provided in the grooves 9 of the first batten 3 (see FIGS. 4 and 5) while the second batten 5 is provided on top of the former in a manner such that the grooves 9 of the first batten are closed by the smooth side of the second batten, that is to say, by the other side than that which contains the grooves 11. The connecting lugs 13 are as a result enclosed in the grooves 9. In addition, these lugs are locked against axial displacement, that is to say displacement in the longitudinal direction of the connecting lugs 13, in that the lugs 13 are provided with at least one lateral projection 15 and 17, which grip around the battens as shown in FIGS. 4 and 5. Preferably, a pair of projections 15—15 and 17—17 are provided on each of the ends of each connecting lug 13 which projections, in the manner shown, occupy the deep end of each of the grooves 9 and 11 of the battens 3 and 5 when situated on top of each other. The connecting lugs then co-operate to keep the battens 3 and 5 in a position so that they exactly cover each other. In addition, the lower of the projections 17 in FIG. 4 situated on the outside of the frame is provided with a lengthening or extension piece 19 directed to the outside at right angles; the piece 19 projects a few millimeters outside the frame and serves as a soldering lug. The end 21 of the wire to be connected to the extension 19 is turned around the piece 19 as shown in FIG. 4 and soldered to it. Additional connecting wires may also be attached to the lengthening piece or soldering lug 19.

The connecting lugs 13 are placed in the grooves 9 with the projections 17, 19 alternately inverted, i.e., upwards (FIG. 5) and downwards (FIG. 4) preferably in the manner as shown. The mutual distance of adjacent soldering lugs 19 in the same frame is then as large as possible. If necessary, it is possible to deviate from this arrangement.

As shown in solid and broken lines in FIG. 4 the elongated projections 17, 19 directed downwards, that is to say, towards the smooth surface of batten 3, preferably projects a little beyond the (smooth) base of the batten 3. This is of advantage when two complete frames, each consisting of two battens, are provided on each other, some of which are connected mutually by soldering lugs. If it is ensured that the lug of the lower frame lying immediately below a lug of the upper frame to be connected, has the position shown in FIG. 5 (shown in FIG. 4 in dotted lines) the wires wound around the soldering lugs 19 may immediately engage one another and be connected directly by dip soldering.

What is claimed is:
1. An insulating frame for a memory core matrix, said frame comprising a first and second batten of open rectangular construction, each said batten having a plurality of transverse grooves in a surface thereof extending from the opening in said frame to the marginal edge of said frame, means securing said battens in superimposed relation with the grooved surface of one said batten abutting the surface opposite the grooved surface of the other said batten, a plurality of connecting lugs within the grooves of said one batten, said lugs being disposed between said battens and in alignment with the corresponding groove of the other said batten, said connecting lugs having a soldering piece projecting outwardly from said marginal edge whereby the wires of said memory matrix are guided in grooves aligned with a connecting lug.

2. An insulating frame according to claim 1 wherein the depth of at least some of said grooves is greater at each end thereof and at least some of said connecting lugs have oppositely directed extensions receivable in the deep portion of said grooves for embracing each batten of said frame to prevent relative movement in the plane of the interface therebetween.

3. An insulating frame for a memory core matrix, said frame comprising a first and second batten of open rectangular construction, a plurality of identical transverse grooves in one major surface of each said batten, said grooves extending from the opening in said frame to the outer marginal edge thereof, the ends of said grooves extending through the thickness of said battens at the edges thereof, means securing said battens in sandwiched relation with the grooves of one said batten opening into the interface therebetween and the grooves of the other said batten opening outwardly of said frame, a plurality of connecting pieces within the grooves opening into said interface, said connecting pieces having oppositely directed projections within said ends of said grooves embracing each said batten for securing said battens against relative movement in the plane of said interface, an offset soldering tag at one end of each said connecting lug extending outwardly from said frame, and the adjacent connecting lugs of said frame being alternately inverted whereby the associated soldering tags are in spaced parallel relation.

4. An insulating frame according to claim 3 wherein the offset soldering tags of said connecting lugs in one of the alternate positions thereof projects beyond said frame in a plane normal to said interface as well as in a plane parallel with said interface.

References Cited by the Examiner

UNITED STATES PATENTS 2,724,095  11/55  Rudner _____ 339—210

FOREIGN PATENTS 843,077  8/60  Great Britain.

IRVING L. SRAGOW, *Primary Examiner.*